(12) United States Patent
Yang

(10) Patent No.: US 10,459,966 B2
(45) Date of Patent: Oct. 29, 2019

(54) METHOD, ELECTRONIC DEVICE, AND COMPUTER READABLE MEDIUM FOR PHOTO ORGANIZATION

(71) Applicant: Acer Incorporated, New Taipei (TW)

(72) Inventor: Tsung-Han Yang, New Taipei (TW)

(73) Assignee: Acer Incorporated, New Taipei (TW)

( * ) Notice: Subject to any disclaimer, the term of this patent is extended or adjusted under 35 U.S.C. 154(b) by 545 days.

(21) Appl. No.: 15/261,577

(22) Filed: Sep. 9, 2016

(65) Prior Publication Data

US 2017/0132224 A1    May 11, 2017

(30) Foreign Application Priority Data

Nov. 5, 2015    (TW) .............................. 104136438 A

(51) Int. Cl.
*G06F 16/20* (2019.01)
*G06F 16/51* (2019.01)
*G06F 16/29* (2019.01)
*G06F 16/58* (2019.01)

(52) U.S. Cl.
CPC .............. *G06F 16/51* (2019.01); *G06F 16/29* (2019.01); *G06F 16/58* (2019.01)

(58) Field of Classification Search
None
See application file for complete search history.

(56) References Cited

U.S. PATENT DOCUMENTS

| 2007/0081813 A1* | 4/2007 | Hong ..................... G03B 17/24 396/310 |
| 2007/0115378 A1* | 5/2007 | Wang ..................... A61B 1/041 348/308 |
| 2010/0277615 A1* | 11/2010 | Watazawa .............. H04N 5/772 348/231.5 |
| 2011/0317885 A1 | 12/2011 | Leung et al. |

FOREIGN PATENT DOCUMENTS

| CN | 101510311 | 8/2009 |
| CN | 104598932 | 5/2015 |
| TW | 201022967 | 6/2010 |

* cited by examiner

*Primary Examiner* — Belix M Ortiz Ditren
(74) *Attorney, Agent, or Firm* — J.C. Patents

(57) ABSTRACT

A method, an electronic device, and a computer program product for photo organization are provided, where the method is adapted to an electronic device and includes the following steps. First, multiple photos are obtained, and multiple special photos are selected from the photos, where each of the photos includes time information and GPS information. The special photos are sorted from the earliest to the most recent according to the time information. One of the special photos is defined as an origin photo, and the special photos sorted after the origin photo are defined as relative photos. A moving distance and a moving angle of each of the relative photos with respect to the origin photo are calculated according to the GPS information. The origin photo and the relative photos are classified into multiple location groups according to variations of the moving distances and variations of the moving angles.

9 Claims, 4 Drawing Sheets

METHOD, ELECTRONIC DEVICE, AND COMPUTER READABLE MEDIUM FOR PHOTO ORGANIZATION

CROSS-REFERENCE TO RELATED APPLICATION

This application claims the priority benefit of Taiwan application serial no. 104136438, filed on Nov. 5, 2015. The entirety of the above-mentioned patent application is hereby incorporated by reference herein and made a part of this specification.

TECHNICAL FIELD

The disclosure relates to a technique for photo organization.

BACKGROUND

With development in technology, various smart image capturing devices, such as tablet computers, personal digital assistants and smart phones, have become indispensable tools for people nowadays. Camera lenses equipped in high-end smart image capturing devices provide same or better specifications than those of traditional consumer cameras, and some even provide near-equivalent pixel qualities to those of digital single lens reflex cameras.

Commonly adopted schemes to organize taken photos are by name, by location, and by time, and yet very few users would organize their photos during photo shooting. Some existing cloud storage spaces have been provided to automatically organize photos uploaded by users. However, their adopted schemes could hardly identify special and meaningful photos for the users.

SUMMARY OF THE DISCLOSURE

Accordingly, the disclosure is directed to a method, an electronic device and a computer-readable medium for photo organization, which provides a speedy and effective solution to automatically organize photos.

According to one of the embodiments, the disclosure is directed to a method for photo organization. The method is adapted to an electronic device and includes the following steps. First, multiple photos are obtained, and multiple special photos are selected from the photos, where each of the photos includes time information and global positioning system (GPS) information. The special photos are sorted from the earliest to the most recent according to the time information. One of the special photos is defined as an origin photo, and the special photos sorted after the origin photo are defined as relative photos. A moving distance and a moving angle of each of the relative photos with respect to the origin photo are calculated according to the GPS information. The origin photo and the relative photos are classified into multiple location groups according to variations of the moving distances and variations of the moving angles.

According to one of the embodiments, the disclosure is directed to an electronic device including a memory and a processor, where the processor is coupled to the memory. The memory is configured to record modules. The processor is configured to access and execute the modules recorded in the memory. The modules include an obtaining module, a selecting module, a sorting module, a calculating module, and a grouping module. The obtaining module is configured to obtain multiple photos, where each of the photos includes time information and GPS information. The selecting module is configured to select multiple special photos from the photos. The sorting module is configured to sort the special photos from the earliest to the most recent according to the time information. The calculating module is configured to define one of the special photos as an origin photo and the special photos sorted after the origin photo as relative photos, and calculate a moving distance and a moving angle of each of the relative photos with respect to the original photo according to the GPS information. The grouping module is configured to classify the origin photo and the relative photos into a plurality of location groups according to variations of the moving distances and variations of the moving angles.

According to one of the embodiments, the disclosure is directed to a non-transitory computer readable medium storing programs to be loaded into an electronic device to perform the following steps. First, multiple photos are obtained, and multiple special photos are selected from the photos, where each of the photos includes time information and GPS information. The special photos are sorted from the earliest to the most recent according to the time information. One of the special photos is defined as an origin photo, and the special photos sorted after the origin photo are defined as relative photos. A moving distance and a moving angle of each of the relative photos with respect to the origin photo are calculated according to the GPS information. The origin photo and the relative photos are classified into multiple location groups according to variations of the moving distances and variations of the moving angles.

In view of the aforementioned descriptions, as for the method, the electronic device, and the computer-readable medium for photo organization disclosed herein, special photos are selected from multiple photos and sorted from the earliest to the most recent according to time information so as to define an origin photo and relative photos. Next, the origin photo and relative photos are classified into multiple groups representing different geography locations according to variations of movements of the relative photos with respect to the origin photo, and thus a speedy and effective solution to organize photos is provided for users.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

Figure 1:
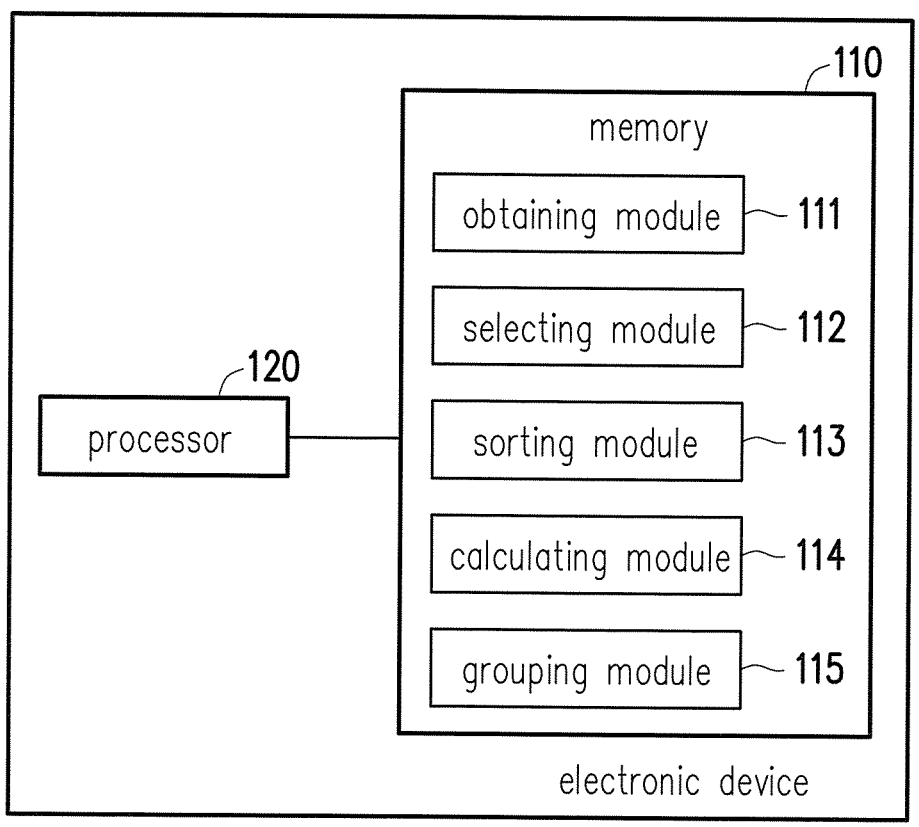
FIG. 1 illustrates a block diagram of an electronic device according to an embodiment of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of an electronic device according to an embodiment of the disclosure. It should, however, be noted that this is merely an illustrative example and the disclosure is not limited in this regard. All components of the electronic device and their configurations are first introduced in FIG. 1. The detailed functionalities of the components are disclosed in more detail in conjunction with FIG. 2.

Referring to FIG. 1, an electronic device 100 includes a memory 110 and a processor 120. In the present embodiment, the electronic device 100 may be a device with image capturing and computation features such as a digital camera, a digital single lens reflex camera, a smart phone, a tabular computer, a personal digital assistant, and a head-mounted display, or a device capable of performing complicated computation such as a personal computer, a cloud server, and an application server. The disclosure is not limited herein.

The memory 110 may be one or a combination of a stationary or mobile random access memory (RAM), a read-only memory (ROM), a flash memory, a hard drive or other similar devices. The memory 110 is configured to store files and data. Moreover, the memory 130 is further configured to record multiple modules executed by the processor 120. The modules include an obtaining module 111, a selecting module 112, a sorting module 113, a calculating module 114, and a grouping module 115.

The processor 120 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. The processing unit 120 is coupled to the memory 110 and configured to organize photos.

Figure 2:
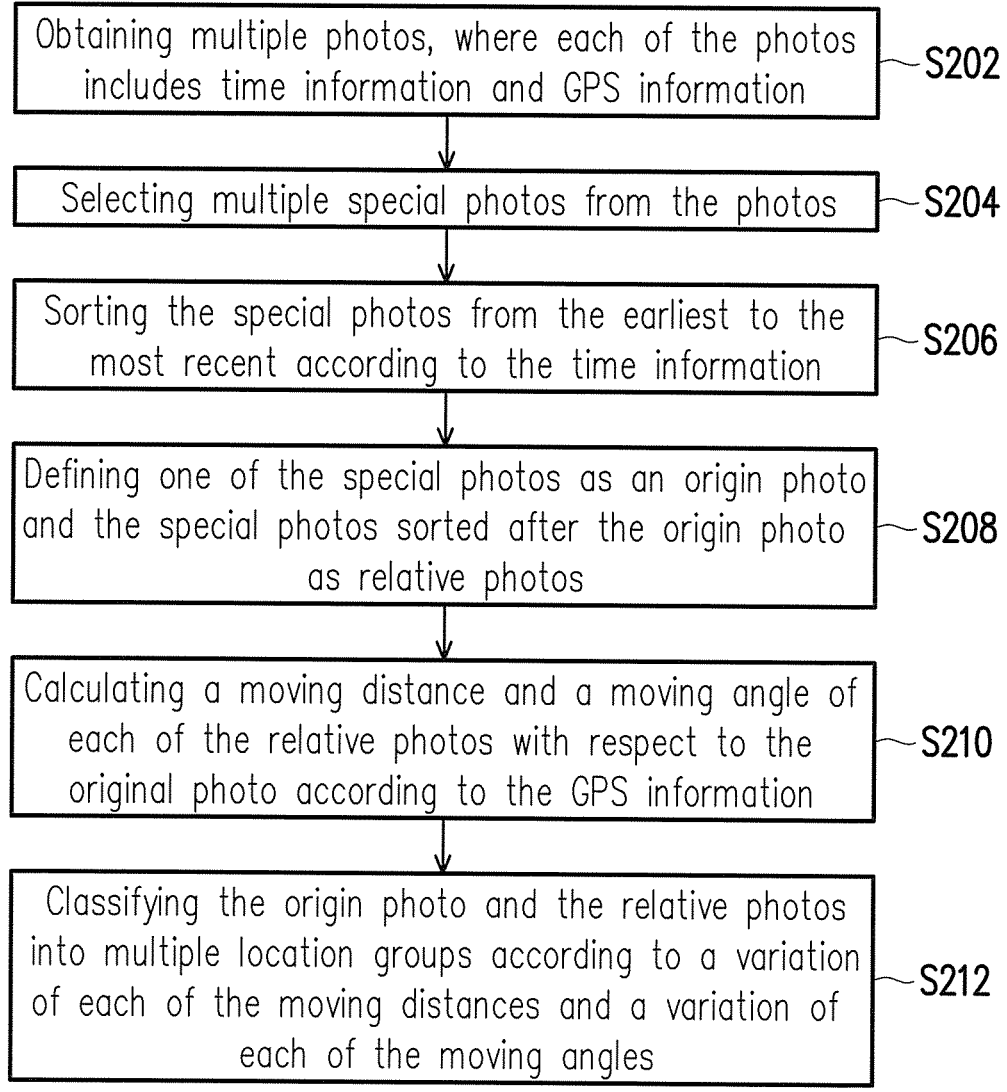
FIG. 2 illustrates a flowchart of a method for photo organization according to an embodiment of the disclosure.

FIG. 2 illustrates a flowchart of a method for photo organization according to an embodiment of the disclosure. The method in FIG. 2 may be implemented by the components of the electronic device 100 in FIG. 1, where the electronic device is a device with image capturing and computation features. In other words, after the user takes photos by using a camera feature of the electronic device 100, the processor 120 of the electronic device 100 would automatically perform the method for photo organization as proposed in the disclosure. Detailed steps of the proposed method would be illustrated along with the components of the electronic device 100.

First, the obtaining module 111 of the electronic device 100 would obtain multiple photos (Step S202), and the selecting module 112 would select multiple special photos from the photos (Step S204). Each of the photos herein would include time information and GPS information, where the time information may include data and time, and the GPS information may include data such as latitude, longitude, and height. After the obtaining module 111 obtains the photos, the selecting module 112 would select the special photos by using a predefined mechanism according to the information of each of the photos.

In an embodiment, the selecting module 112 may determine whether each of the photos is associated with multiple predefined frequent locations and set the photos not associated with the predefined frequent locations as the special photos. In other words, the selecting module 112 may classify the photos taken by the user according to locations. The more frequent locations appearing in the photos may be frequently visited by the user in his/her daily life and may be filtered out. On the other hand, the less frequent locations may be special for the user.

In another embodiment, the selecting module 112 may determine whether each of the photos is associated with a specific intensive photo-shooting time period and set the photos associated with the specific intensive photo-shooting time period as the special photos. In other words, the photos intensively taken within a specific time period may be also special for the user.

After the selecting module 112 selects the specific photos, the sorting module 113 would sort the special photos from the earliest to the most recent according to the time information thereof (Step S206). The calculating module 114 may define one of the special photos as an origin photo and the special photos sorted after the origin photo as relative photos (Step S208), where such step may be considered as a pre-processing step for photo classification.

In an embodiment, since the special photos are the photos being selected, the calculating module 114 would define a first special photo among the sorted special photos as the origin photo.

In another embodiment, the calculating module 114 may define a first special photo, among the sorted special photos, with a corresponding distance from a previous special photo being greater than an origin determination threshold as the origin photo. The origin determination threshold may be, for example, a distance between two countries. For example, assume that the user went to Japan from Taiwan Taoyuan International Airport and successively stayed in Osaka, Kyoto, and Nagoya. The calculating module 114 may set a first photo taken in Osaka as the origin photo. In such case, the calculating module 114 would not set any photo taken in Taiwan Taoyuan International Airport as the origin photo due to a far distance between Taiwan and Japan that would affect determinations for photo classification in follow-up steps.

Next, the calculating module 114 would calculate a moving distance and a moving angle of each of the relative photos with respect to the original photo according to the GPS information (Step S210), and the grouping module 115 would classify the origin photo and the relative photos into multiple location groups according to a variation of each of the moving distances and a variation of each of the moving angles (Step S212). To be specific, the calculating module 114 may first obtain the moving distance and the moving angle of each of the relative photos with respect to the origin photo, calculate a difference between the moving distance corresponding to the relative photo and the moving distance corresponding to a previous relative photo, and calculate a difference between the moving angle corresponding to the relative photo and the moving angle corresponding to a previous relative photo so as to obtain the variation of the moving distance and the moving angle corresponding to each of the relative photos. In general, when the variations of the moving distance and the moving angle are large, they may represent different locations. Hence, the grouping module 115 may perform classification on the origin photos and the relative photos according to whether the variation of the moving distance and the variation of the moving angle corresponding to each of the relative photos are respectively greater than predefined thresholds.

In an embodiment, the grouping module 115 may mark a relative photo to set it as the aforesaid marked photo only when the variation of the moving distance corresponding to such relative photo is greater than a distance variation threshold. In another embodiment, with a stricter requirement, the grouping module 115 may mark a relative photo to set it as the aforesaid marked photo when the variation of the moving distance corresponding to such relative photo is greater than a distance variation threshold and the variation of the moving angle corresponding to such relative photo is greater than an angle variation threshold. However, it is possible that all the relative photos are moving circularly with respect to the origin photo. Therefore, in another embodiment, the grouping module 115 may mark a relative photo to set it as the aforesaid marked photo only when the variation of the moving angle corresponding to such relative photo is greater than an angle variation threshold. Moreover, the grouping module 115 may directly preset the original photo as the marked photo. After the grouping module 115 has done all the markings, it may classify the marked photo as well as the relative photos sorted between the marked photo and a next marked photo as a same location group.

Figure 3A:
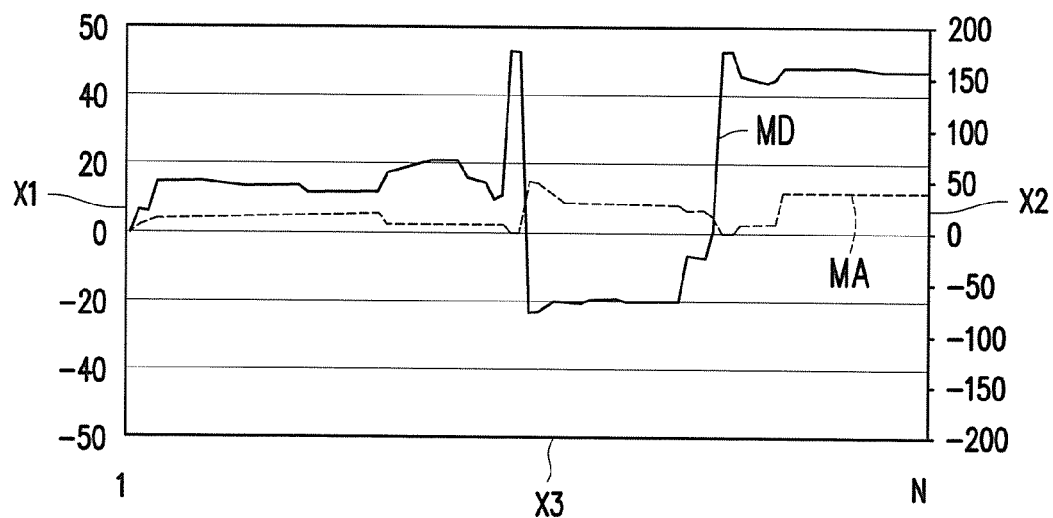
FIG. 3A illustrates curves of moving distances and moving angles of relative photos according to an embodiment of the disclosure.
Figure 3B:
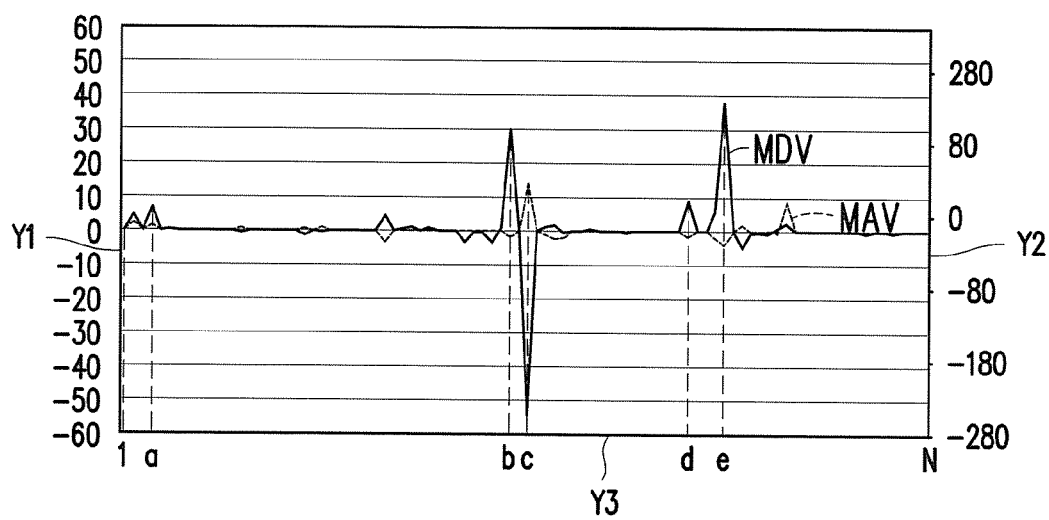
FIG. 3B illustrates curves of variations of moving distances and moving angles of relative photos according to an embodiment of the disclosure.

To be specific, FIG. 3A illustrates curves of moving distances and moving angles of relative photos according to an embodiment of the disclosure, and FIG. 3B illustrates curves of variations of moving distances and moving angles of relative photos according to an embodiment of the disclosure.

In FIG. 3A, a curve MD corresponding to an X1 axis represents moving distances of relative photos with respect to an origin photo, and a curve MA corresponding to an X2 axis represents moving angles of the relative photos with respect to the origin photo. Numbers on an X3 axis represent indices of the origin photo and the relative photos after being sorted, where the index of the origin photo is 1, and the indices of the relative photos are 2-N.

After each data of the curve MD and the curve MA is respectively subtracted by its preceding data, a curve MDV corresponding to a Y1 axis (i.e. variations of the moving distances corresponding to the relative photos) and a curve MAV corresponding to a Y2 axis (i.e. variations of the moving angles corresponding to the relative photos) would be obtained in FIG. 3B, where numbers on an Y3 axis still represent indices of the origin photo and the relative photos after being sorted. As illustrated in FIG. 3B, since the moving distances and the moving angles corresponding to the relative photos with indices a, b, c, d, and e have drastic variations, the grouping module 115 would set the relative photos with indices a, b, c, d, and e as well as the origin photo with an index 1 as marked photos. Next, the grouping module 115 would respectively set the relative photos with indices 1 to a-1, the relative photos with indices a to b-1, the relative photos with indices b to c-1, the relative photos with indices c to d-1, the relative photos with indices d to e-1, and the relative photos with indices e to N as same groups. In other words, in this case, the grouping module 115 would classify the origin photo and the relative photos into six groups, where each of the groups corresponds to a different location.

In the previous embodiment, the calculating module 114 identifies different locations based on two conditions (i.e. the variations of the moving distances and the moving angles of the relative photos). However, assume that the user gradually moves from a location towards another location. The grouping module 115 could possibly be unable to recognize that the user actually moves between more than two main locations. Hence, in another embodiment, the grouping module 115 would add a third condition for identification.

It should be noted that, the grouping module 115 may set the marked photos based on the two conditions and then add more marked photos based on the third condition. In another embodiment, the grouping module 115 may set the marked photos at the same time based on the three conditions through a weighted sum, and yet the disclosure is not limited herein.

In the present embodiment, the grouping module 115 would define a temporary origin photo among the relative photos, where among the relative photos, the temporary origin photo is a first relative photo with the moving distance greater than an origin reset threshold. In addition, the grouping module 115 would also set the temporary origin photo as one of the marked photos.

Next, the calculating module 115 would calculate a distance of each of the relative photos sorted after the temporary origin photo with respect to the temporary origin photo, where the calculated distance is referred to as "another moving distance" hereafter. Similarly, the grouping module 115 would redefine the temporary origin photo according to "the another moving distance", where the redefined temporary origin photo is a first relative photo with the another moving distance greater than the origin reset threshold. The grouping module 115 would also set the redefined temporary origin photo as one of the marked photos. The grouping module 115 would continuously redefine the temporary origin photo using the same approach until the last relative photo has been iterated.

Figure 4:
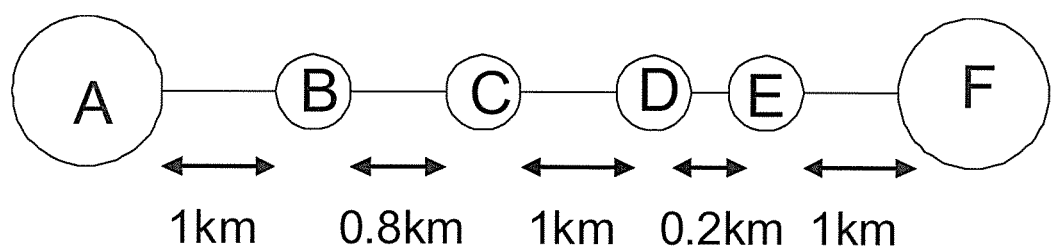
FIG. 4 illustrates a schematic diagram to determine a temporary origin photo according to an embodiment of the disclosure.

To be specific, FIG. 4 illustrates a schematic diagram to determine a temporary origin photo according to an embodiment of the disclosure.

Referring to FIG. 4, assume that a predetermined distance variation is 3 km, an origin reset threshold is 2 km, A is an origin photo, and B-F are relative photos. The grouping module 115 would directly set the origin photo A as a marked photo. Since a variation of a moving distance corresponding to each of the relative photos is less than the predetermined distance variation, the grouping module 115 would classify the origin photo A and the relative photos B-F as the same group only on a basis of the variations of the moving distances.

However, since the moving distances of the relative photos B-D with respect to the origin A are 1 km, 1.8 km, and 2.8 km, the grouping module 155 would set a first relative photo with the moving distance greater than the origin reset threshold (i.e. the relative photo D) as a temporary origin photo. The grouping module 155 would also set the relative photo D as a marked photo. Herein, the moving distances of the relative photos E-F with respect to the temporary origin photo D are 0.2 km and 1 km, and none of which has reached the origin reset threshold. Hence, in such case, the origin photo A and the relative photo D would be the marked photos, and the grouping module 115 would classify the origin photo A and the relative photos B-C into a same group and classify the relative photos D-E into another same group.

In the present embodiment, the grouping module 115 may further label each of the location groups with a location name. This could be done by performing reverse geocoding on any of the relative photos in a same location group according to its GPS information so as to convert the GPS information to an actual address including a country name, a city name, and a street name or a scenery name. Next, the grouping module 115 would label all the photos in a same group with the reversely geocoded location name. In the present embodiment, for a same location group, the grouping module 115 would only perform reverse geocoding once to search for the location and label each photo with the same location name, and thus the photo organization process would be speed up.

In an application scenario, the electronic device 100 could provide a travel grouping option for a photo folder with multiple photos. When the user clicks on the travel grouping option, the electronic device 100 would select, group, and label locations for the photos in the photo folder so as to assist the user to look back at the travel moments. Moreover, the electronic device 100 could further provide follow-up services accordingly. For example, a travel itinerary could be constructed based on the time information and the locations labelled on the photos as a reference for the user or as shared information.

The disclosure also provides a non-transitory computer readable medium, which records computer program to be loaded into an electronic device to execute the steps of the aforementioned method for photo organization in FIG. 2. The computer program is composed of a plurality of program instructions (for example, an organization chart, establishing program instruction, a table approving program instruction, a setting program instruction, and a deployment program instruction, etc.), and these program instructions are loaded into the electronic device and executed by the same to accomplish various steps of the aforementioned method for photo organization.

In view of the aforementioned descriptions, as for the method, the electronic device, and the computer-readable medium for photo organization disclosed herein, special photos are selected from multiple photos and sorted from the earliest to the most recent according to time information so as to define an origin photo and relative photos. Next, the origin photo and relative photos are classified into multiple groups representing different geography locations according to variations of movements of the relative photos with respect to the origin photo. Moreover, for a same location group, reverse geocoding would only be performed once to search for the location and label each photo with the same location name, and thus a speedy and effective solution to organize photos is provided for users.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for photo organization, adapted to an electronic device, comprising:
   obtaining a plurality of photos and selecting a plurality of special photos from the photos, wherein each of the photos comprises time information and global positioning system (GPS) information;
   sorting the special photos from the earliest to the most recent according to the time information thereof;
   defining one of the special photos as an origin photo and the special photos sorted after the origin photo as relative photos;
   calculating a moving distance and a moving angle of each of the relative photos with respect to the original photo according to the GPS information of the origin photo and the relative photos; and
   classifying the origin photo and the relative photos into a plurality of location groups according to variations of the moving distances and variations of the moving angles comprising:
      for each of the relative photos:
         calculating a difference between the moving distance corresponding to the relative photo and the moving distance corresponding to a previous relative photo so as to obtain the variation of the moving distance corresponding to the relative photo; and
         calculating a difference between the moving angle corresponding to the relative photo and the moving angle corresponding to a previous relative photo so as to obtain the variation of the moving angle corresponding to the relative photo;
      setting a plurality of marked photos among the relative photos according to whether the variation of the moving distance corresponding to each of the relative photos is greater than a distance variation threshold and/or whether the variation of the moving angle corresponding to each of the relative photos is greater than an angle variation threshold;
      setting the original photo as another marked photo; and
      for each of the marked photos, classifying the marked photo as well as the relative photos sorted after the marked photo and before a next marked photo as a same location group among the location groups.

2. The method according to claim 1, wherein the step of selecting the special photos from the photos comprises:
   for each of the photos:
      determining whether the photo is associated with a plurality of predefined frequent locations according to the GPS information of the photo; and
      if not, setting the photo as one of the special photos.

3. The method according to claim 1, wherein the step of selecting the special photos from the photos comprises:
for each of the photos:
determining whether the photo is associated with a specific intensive photo-shooting time period according to the time information of the photo; and
if yes, setting the photo as one of the special photos.

4. The method according to claim 1, wherein the step of defining one of the special photos as the origin photo comprises:
defining a first special photo among the sorted special photos as the origin photo.

5. The method according to claim 1, wherein the step of defining one of the special photos as the origin photo comprises:
defining a first special photo, among the sorted special photos, with a corresponding distance from a previous special photo being greater than an origin determination threshold as the origin photo.

6. The method according to claim 1, wherein the step of setting the marked photos among the relative photos further comprises:
defining a temporary origin photo among the relative photos, and adding the temporary origin photo to be one of the marked photos, wherein the temporary origin photo is a first relative photo, among the relative photos, with the moving distance being greater than an origin reset threshold;
calculating another moving distance of each of the relative photos sorted after the temporary origin photo with respect to the temporary origin photo, and redefining a first relative photo with the another moving distance being greater than the origin reset threshold as the temporary origin photo; and
setting the redefined temporary origin photo as one of the marked photos.

7. The method according to claim 1 further comprising:
for each of the location groups:
performing reverse geocoding on the GPS information of any one of the relative photos in the location group so as to generate a location name corresponding to the location group; and
labelling the relative photos in the location group with the location name.

8. An electronic device comprising:
a memory;
a processor, coupled to the memory and configured to:
obtain a plurality of photos, wherein each of the photos comprises time information and global positioning system (GPS) information;
select a plurality of special photos from the photos;
sort the special photos from the earliest to the most recent according to the time information thereof;
define one of the special photos as an origin photo and the special photos sorted after the origin photo as relative photos, and calculate a moving distance and a moving angle of each of the relative photos with respect to the original photo according to the GPS information of the origin photo and the relative photos; and
classify the origin photo and the relative photos into a plurality of location groups according to variations of the moving distances and variations of the moving angles comprising:
for each of the relative photos:
to calculate a difference between the moving distance corresponding to the relative photo and the moving distance corresponding to a previous relative photo so as to obtain the variation of the moving distance corresponding to the relative photo; and
to calculate a difference between the moving angle corresponding to the relative photo and the moving angle corresponding to a previous relative photo so as to obtain the variation of the moving angle corresponding to the relative photo;
to set a plurality of marked photos among the relative photos according to whether the variation of the moving distance corresponding to each of the relative photos is greater than a distance variation threshold and/or whether the variation of the moving angle corresponding to each of the relative photos is greater than an angle variation threshold;
to set the original photo as another marked photo; and
for each of the marked photos, to classify the marked photo as well as the relative photos sorted after the marked photo and before a next marked photo as a same location group among the location groups.

9. A non-transitory computer readable medium, storing programs to be loaded into an electronic device to perform steps of:
obtaining a plurality of photos and selecting a plurality of special photos from the photos, wherein each of the photos comprises time information and global positioning system (GPS) information;
sorting the special photos from the earliest to the most recent according to the time information thereof;
defining one of the special photos as an origin photo and the special photos sorted after the origin photo as relative photos;
calculating a moving distance and a moving angle of each of the relative photos with respect to the original photo according to the GPS information of the origin photo and the relative photos; and
classifying the origin photo and the relative photos into a plurality of location groups according to variations of the moving distances and variations of the moving angles comprising:
for each of the relative photos:
calculating a difference between the moving distance corresponding to the relative photo and the moving distance corresponding to a previous relative photo so as to obtain the variation of the moving distance corresponding to the relative photo; and
calculating a difference between the moving angle corresponding to the relative photo and the moving angle corresponding to a previous relative photo so as to obtain the variation of the moving angle corresponding to the relative photo;
setting a plurality of marked photos among the relative photos according to whether the variation of the moving distance corresponding to each of the relative photos is greater than a distance variation threshold and/or whether the variation of the moving angle corresponding to each of the relative photos is greater than an angle variation threshold;
setting the original photo as another marked photo; and
for each of the marked photos, classifying the marked photo as well as the relative photos sorted after the marked photo and before a next marked photo as a same location group among the location groups.

* * * * *